United States Patent Office 2,811,512
Patented Oct. 29, 1957

2,811,512

ORGANIC POLYESTERS FROM TETRAHYDROFURANS AND DICARBOXYLIC ACIDS

Paul R. Austin, Wilmington, Del., and Oliver W. Cass, Lewiston, N. Y., assignors to E. I. du Pont de Nemours & Company, Wilmington, Del., a corporation of Delaware No Drawing. Application July 15, 1953,
Serial No. 368,220

6 Claims. (Cl. 260—78.4)

This invention relates to novel and useful organic polyesters made by the reaction of tetrahydrofuran with organic dibasic anhydrides and to the synthesis of these polyesters.

In recent years the manufacture of plastics of various types has come to occupy a major position in the chemical industry. Among the plastics, the commercial manufacture of which is still rapidly increasing, are the linear polyesters, particularly useful in formulations used as bonding and coating materials. These compounds may be and generally are obtained commercially as products of reaction between dibasic organic acids or dibasic organic anhydrides with glycols. A first object of this invention is provision of a new and useful method for synthesizing plastic materials. A further object is development of a process for making plastic which can be modified by the addition of a compound such as styrene and thus made suitable as a bonding agent. Another object of the invention is development of a process for making linear polyesters.

We have found that the above mentioned and still further objects of the invention can be achieved by a process in which tetrahydrofuran is reacted with a dibasic organic anhydride in the presence of a suitable catalyst. The equation for the reaction in which maleic anhydride is used as the dibasic anhydride may be written as follows:

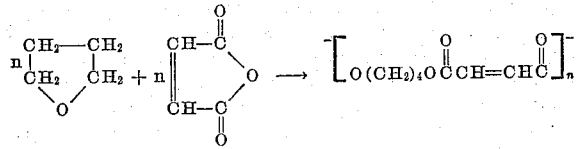

wherein $n$ represents the number of structural units in the final chain. Similar equations may be written for the reactions involving other anhydrides.

Linear polyesters have heretofore been synthesized from ethylene oxide or ethylene oxide derivatives and dibasic organic anhydrides. Ethylene oxide, the first member of the oxygen heterocyclic series, is particularly reactive and possesses a ring that can be opened with ease. Tetrahydrofuran, on the other hand, has a very stable, five-membered ring which can be cleaved only with certain specific catalysts. The preferred catalyst for the purpose of this invention is boron trifluoride utilized in the form of the gas, BF₃, or of the etherate,

BF₃·(C₂H₅)₂O but other acid catalysts of the type described by G. N. Lewis, Journal of the Franklin Institute, 226, 293 (1938), can be used as well. These catalysts include particularly boric oxide, anhydrous stannic chloride, sulfuric acid, ferric chloride and zinc chloride. It should be noted that in the absence of catalyst no polyester is formed. About 1-2 mole percent of the catalyst is preferred although somewhat less than 1% or even up to 10% can be utilized.

In most of the methods used for preparing linear polyesters a volatile product such as water or alcohol is formed along with the desired polyester. For example, when a dibasic acid and a glycol are used in the preparation of these polyesters, two molecules of water are formed for each polyester unit as in the following equation:

nHOOC(CH₂)ₓCOOH+nHO(CH₂)ᵧOH→
—[CO(CH₂)ₓCOO(CH₂)ᵧO]—ₙ+2nH₂O where the $x$'s and $y$'s represent the number of methylene groups in the respective compounds.

In case a diabasic anhydride is used in place of the dibasic acid one molecule of water is formed for each polyester unit:

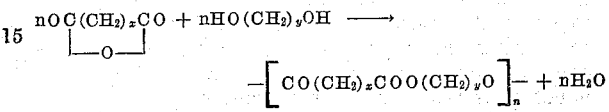

However, when tetrahydrofuran is used instead of a glycol in accordance with this invention, the desired polyester is the sole product of the reaction:

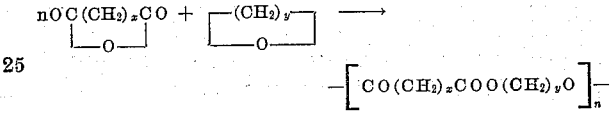

The reaction between tetrahydrofuran and dibasic organic anhydrides, in addition to requiring a specific type of catalyst, must be carried out at an elevated temperature and pressure. Best results are obtained when the reaction is run in a stirred autoclave at about 175° C. for 24 hours or at 200° C. for 9 hours. Higher temperatures are also effective but a minimum of about 150° C. is required for good results. Pressure utilized under such conditions is the autogenous pressure developed. That elevated temperatures and superatmospheric pressures are necessary is evident from the fact that when any of the anhydrides of succinic, maleic, or phthalic acids were refluxed at atmospheric pressure using a five-fold excess of tetrahydrofuran in the presence of boron trifluoride etherate for 20 hours no anhydride was consumed.

While tetrahydrofuran has been mentioned as the primary cyclic ether for this invention, substituted tetrahydrofurans such as methyl tetrahydrofuran can also be utilized. Dibasic anhydrides which can be used as the acidic reactant include those of maleic, succinic, phthalic, tetrahydrophthalic and the like acids. The products obtained by interaction between these reactants are generally tacky, amber colored, viscous liquids or solids soluble in chloroform and tetrahydrofuran.

There follow several examples which illustrate various aspects of the invention:

*Example 1*

Into a reaction tube were placed 49.0 parts of maleic anhydride, 36.0 parts of tetrahydrofuran and 1.25 parts (one mole percent) of boron trifluoride etherate. The tube was sealed, heated to 150° C. and held at this temperature for 36 hours. The resultant viscous pale-orange reaction mixture was dissolved in chloroform and washed with water until the washings were only faintly acid. Washing was made difficult by the fact that an emulsion formed each time the chloroform solution was shaken with water and could be broken only by centrifugation. Titration of the combined wash water indicated that 34% of the anhydride utilized was recovered unchanged.

A portion of the washed chloroform solution was dried over anhydrous magnesium sulfate and the residue subjected to infrared analysis. The absence of a detectable aliphatic ether linkage indicated absence of any appreciable amount of polytetrahydrofuran. Several ester bands were partially masked by a solvent band but indicated that the material was a polyester.

A second portion of the chloroform solution was distilled under the reduced pressure of 0.2 mm. Hg until a pot temperature of 350° C. was reached. The vapor temperature did not exceed 45° C. Two samples of the residue from this distillation, a tacky, amber solid, were quantitatively saponified. The saponification numbers obtained corresponded to 90–93% of that expected for the polymeric unit:

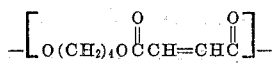

Example 2

Into a tube were placed 9.8 parts of maleic anhydride, 7.2 parts of tetrahydrofuran and 0.2 part of sulfuric acid. This amount of sulfuric acid corresponds to about one mole percent in this instance. The tube was sealed and heated for 24 hours at 150° C. The yellow liquid reaction product was dissolved in tetrahydrofuran and aliquot parts were titrated with caustic. It was found that 40% of the maleic anhydride was consumed to form the polyester.

Example 3

Equimolar amounts of tetrahydrofuran and succinic anhydride and 2 mole percent of the boron trifluoride etherate were heated to 150° C. in a sealed tube for 24 hours. 75% of the anhydride was consumed to yield a polyester in the form of a brown solid.

Example 4

Equimolar amounts of tetrahydrofuran and maleic anhydride and 2 mole percent of stannic chloride were heated at 150° C. in a sealed tube for 24 hours. A 60% yield of a dark blood-red liquid was obtained.

Example 5

The experiment of Example 4 was repeated except that two percent of aluminum chloride was substituted for the stannic chloride catalyst. A 35% yield consisting partly of a dark brown solid and partly of a black liquid was obtained.

Example 6

The experiment of Examples 4 and 5 was repeated except that two mole percent of boric oxid was utilized as the catalyst. A 30% yield of a white solid in an orange liquid was obtained.

Example 7

A run was made with equimolar amounts of maleic anhydride and tetrahydrofuran and two mole percent boron trifluoride etherate as catalyst. The mixture was held at 175° C. for 24 hours in a closed tube. A 65% yield was obtained.

Example 8

A stainless steel autoclave equipped with a stirrer, gas inlet, and oil-heated jacket was used for a number of runs. The autoclave was charged with an equimolar mixture of maleic anhydride and tetrahydrofuran together with 1.05 mole percent of boron fluoride etherate as catalyst and closed. The air in the autoclave was replaced by nitrogen and the contents were then stirred and heated at 175° C. for 21 hours. A yield of 61% of very viscous amber liquid was obtained as indicated by potentiometric titration using 1.0 N sodium hydroxide.

Example 9

Into the autoclave of Example 8 was charged a mixture of maleic anhydride and tetrahydrofuran. About one mole percent of gaseous boron trifluoride dissolved in tetrahydrofuran was added. The mole ratio of maleic anhydride to total tetrahydrofuran was 1:1. The contents of the autoclave were stirred and heated at 200° for 9 hours. A yield of 68% of light amber solid was obtained. The products of this and of subsequent runs were analyzed by potentiometric titration as before.

Example 10

The autoclave was again charged with an equimolar mixture of maleic anhydride and tetrahydrofuran. One mole percent of boric oxid was used as the catalyst. Heating and stirring for 21.5 hours at 200° produced a yield of 50% of viscous amber liquid.

Example 11

The same reactants in the same proportions as in the previous three examples were used in another run but one mole percent of anhydrous antimony pentachloride was employed as the catalyst. Heating and stirring at 200° for 9 hours resulted in a yield of 35% of dark brown liquid.

Example 12

The experiment of Example 9 was substantially repeated except that tetrahydrophthalic anhydride (cis-4-cyclohexene-1,2-dicarboxylic anhydride) was substituted for maleic anhydride. One mole percent of gaseous boron fluoride dissolved in tetrahydrofuran was utilized as catalyst. The molar ratio of tetrahydrophthalic anhydride to total tetrahydrofuran was again 1:1. After heating and stirring the mixture at 200° C. for 24 hours, a 75% yield of a very viscous light amber liquid was obtained.

Example 13

The experiment of Example 9 was substantially repeated except that a small amount of water was added to the reaction mixture. The molar proportions of maleic anhydride, tetrahydrofuran, gaseous boron fluoride and water was 1:1:0.01:0.09. Heating and stirring at 200° C. for 10.5 hours yielded 75% of yellow solid. Water in small quantities thus has some catalytic effect on the reaction. If water is added to the reactants, the amount employed should be kept as small as possible to minimize undesirable side-reactions. A 1:10 molar ratio of water to either reactant is satisfactory.

It will be seen that use of Lewis acid-type catalysts with tetrahydrofuran and acid anhydrides under carefully controlled conditions of temperature and pressure has permitted the achievement of the major objectives of the invention. To test the efficacy of polytetramethylene maleate as a bonding agent, the polyester was admixed with styrene and a catalyst. Glass cloth was impregnated with the resultant syrupy mixture and formed into a laminated structure five plies thick. The laminate obtained on curing this impregnated material had properties similar to those of the glass laminates sold commercially.

The polyesters obtained from tetrahydrofuran and succinic anhydride, phthalic anhydride, and tetrahydrophthalic anhydride are not useful in mixtures with styrene as reinforcing resins but may be useful as plasticizers. A film prepared, for example, from one part of polyester obtained by the reaction between tetrahydrofuran and tetrahydrophthalic anhydride and two parts of polyvinyl chloride was found to be as pliant as one made using a commercial plasticizer.

The process of this invention thus produces new and useful linear polyesters in a simple and efficient manner. Since there are no reaction products besides the polyesters themselves, difficult purification problems are minimized. The polyesters can therefore be separated easily and cheaply from their formative mixtures and utilized directly in such applications as those noted.

Having described our invention, we claim:

1. The process of producing a linear polyester which comprises reacting in equimolar proportions a member of the group consisting of tetrahydrofuran and methyl tetrahydrofuran with an acid anhydride chosen from the group consisting of maleic, succinic, phthalic and tetrahydrophthalic acid anhydrides in the presence of about 1 to 2 mole percent of a member of the group consisting of boron trifluoride, boron trifluoride etherate, boric oxide, stannic chloride, aluminum chloride, antimony pentachloride, sulfuric acid, ferric chloride and zinc chloride.

2. The process of claim 1 in which the reaction temperature is at least 150° C. and the pressure is superatmospheric.

3. The process which comprises reacting equimolar proportions of tetrahydrofuran with maleic anhydride in the presence of about 1 to 2 mole percent of a member of the group consisting of boron trifluoride, boron trifluoride etherate, boric oxide, stannic chloride, aluminum chloride, antimony pentachloride, sulfuric acid, ferric chloride and zinc chloride at a temperature of at least 150° C. and at superatmospheric pressure.

4. The process which comprises reacting equimolar proportions of tetrahydrofuran with succinic anhydride in the presence of about 1 to 2 mole percent of a member of the group consisting of boron trifluoride, boron trifluoride etherate, boric oxide, stannic chloride, aluminum chloride, antimony pentachloride, sulfuric acid, ferric chloride and zinc chloride at a temperature of at least 150° C. and at superatmospheric pressure.

5. The process which comprises reacting equimolar proportions of tetrahydrofuran with phthalic anhydride in the presence of about 1 to 2 mole percent of a member of the group consisting of boron trifluoride, boron trifluoride etherate, boric oxide, stannic chloride, aluminum chloride, antimony pentachloride, sulfuric acid, ferric chloride and zinc chloride at a temperature of at least 150° C. and at superatmospheric pressure.

6. The process which comprises reacting equimolar proportions of tetrahydrofuran with tetrahydrophthalic anhydride in the presence of about 1 to 2 mole percent of a member of the group consisting of boron trifluoride, boron trifluoride etherate, boric oxide, stannic chloride, aluminum chloride, antimony pentachloride, sulfuric acid, ferric chloride and zinc chloride at a temperature of at least 150° C. and at superatmospheric pressure.

References Cited in the file of this patent

UNITED STATES PATENTS

| | | |
|---|---|---|
| 2,437,046 | Rothrock et al. | Mar. 2, 1948 |
| 2,576,268 | Shugar et al. | Nov. 27, 1951 |

FOREIGN PATENTS

| | | |
|---|---|---|
| 500,300 | Great Britain | Feb. 7, 1939 |